Nov. 23, 1954  C. F. CLURE  2,695,075
LUBRICATING APPARATUS
Filed March 22, 1951  2 Sheets-Sheet 1

Claremont F. Clure
INVENTOR.

BY Browning & Simms
ATTORNEYS

Nov. 23, 1954
C. F. CLURE
2,695,075
LUBRICATING APPARATUS
Filed March 22, 1951
2 Sheets-Sheet 2
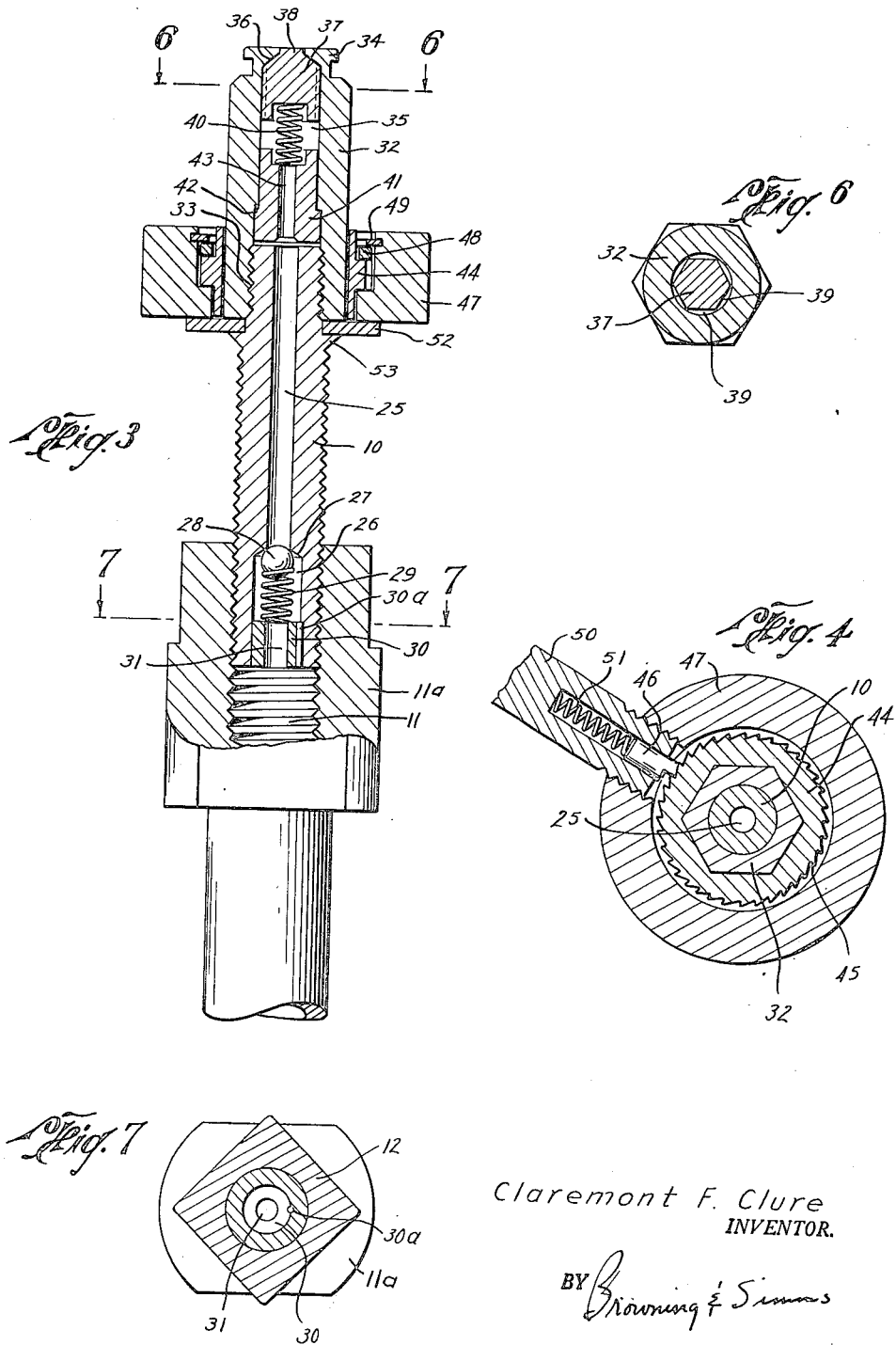
Claremont F. Clure
INVENTOR.
BY Browning & Simms
ATTORNEYS

United States Patent Office

2,695,075
Patented Nov. 23, 1954

2,695,075

LUBRICATING APPARATUS

Claremont F. Clure, Shreveport, La.

Application March 22, 1951, Serial No. 217,012

7 Claims. (Cl. 184—38)

This invention relates to a lubricating apparatus. In one of its aspects, it relates to a lubricating apparatus particularly adapted to be employed to lubricate a valve having a rotatable grease receiving means.

In certain types of valves, particularly plug valves, it is desirable to have periodic lubrication to prevent galling and sticking thereof and to perfect a seal. In some installations, valves of this type must be periodically lubricated in order to provide a protective deposition of grease on their seats, seating elements and lubricating passageways in order to prevent accumulation of carbonaceous and other binding materials therein. Although such valves have been provided with lubricating devices, these have been proven to possess certain disadvantages. Thus, in those types of lubricating devices wherein a plug member is screwed into a lubricant reservoir to force lubricant into the valve seat, operators frequently forget or neglect to lubricate the valves as often as necessary. Also, in such type of lubricators, it is difficult to operate the lubricating device while the valve member is in motion and, as a result, the valve is ordinarily lubricated while the valve member is stationary with resultant poor distribution of lubricant on the valve seat. It has been proposed to provide the plug member of the foregoing type with a means for automatically screwing it into the lubricant chamber while the valve member is being turned so that the lubricant could be more evenly distributed over the valve seat. This proposal has the disadvantage that the plug member must be completely removed from the lubricant reservoir before the latter can be refilled, the latter operation requiring ladling and forcing of lubricant into the reservoir with attendant waste and messiness. Since this refilling operation is a distasteful task, operators have frequently neglected to refill the reservoir and faulty operation of valves has ensued. Thus, the lubricating devices heretofore employed, while sufficient to accomplish their purpose when properly employed, have oftentimes not been so properly employed due to the difficulty of doing so and to the fact that some operators neglect lubricating a valve when it is not easy to do so.

It is an object of this invention to provide a lubricating apparatus which is simple and easy to refill and which is substantially automatic in operation.

Another object of this invention is to provide a lubricating apparatus adapted to force a lubricant from a reservoir and to permit rapid and easy refilling of the reservoir.

Still another object of this invention is to provide a lubricating apparatus which automatically forces a lubricant from a reservoir upon rotation of said reservoir or a portion thereof.

Yet another object of this invention is to provide a lubricating apparatus adapted to automatically force lubricant from a reservoir upon rotation thereof and to permit refilling of the same from an external source such as a grease gun or the like.

Still yet another object of this invention is to provide a lubricating apparatus through which a lubricant can be conducted to fill a reservoir and which is adapted to force lubricant from said reservoir upon rotation thereof.

Even another object of this invention is to provide a lubricating apparatus adapted to be automatically forced into a lubricant reservoir of a valve upon opening or closing of the latter and to permit easy refilling of the reservoir without completely removing the apparatus from the reservoir.

Other objects, advantages and features of this invention will be apparent to one skilled in the art upon a consideration of the written specification, the attached claims and the appended drawings wherein:

Fig. 3 is a partial cross-section taken on the line 3—3 of Fig. 1; and

Figure 1:
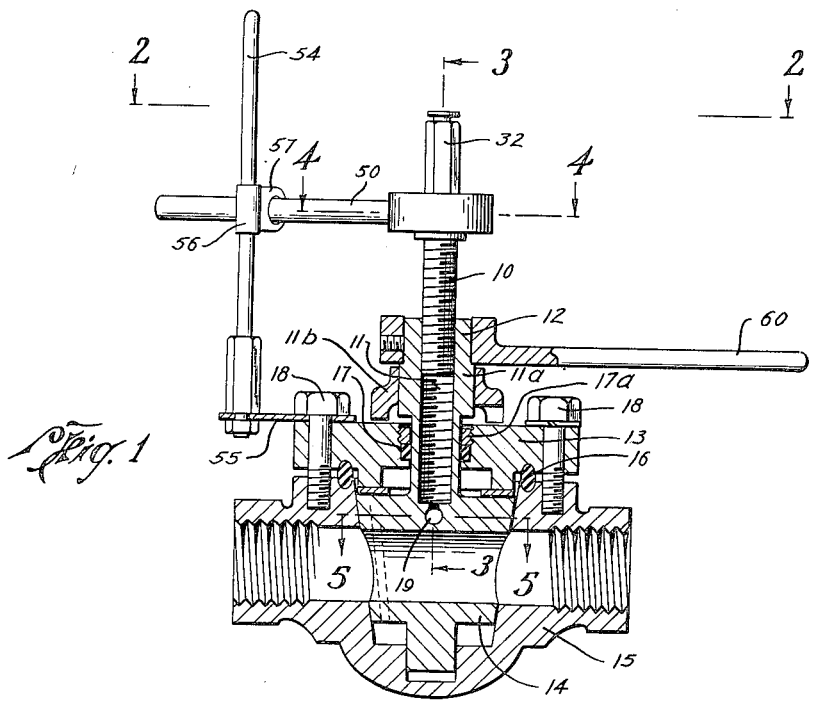
Fig. 1 illustrates a preferred embodiment of the apparatus of this invention in operative association with a valve requiring lubrication.
Figure 2:
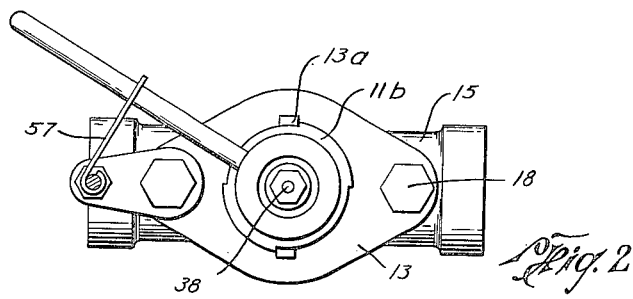
Fig. 2 is a plan view of the apparatus of Fig. 1.
Figure 5:
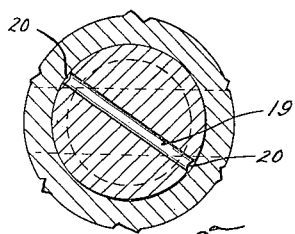

Figs. 4, 5, 6, and 7 are cross-sectional views taken on the lines 4—4 and 5—5 of Fig. 1 and lines 6—6 and 7—7 of Fig. 3, respectively.

Like characters of reference are employed to designate like parts throughout the several views.

Referring now to the drawings, there is provided means adapted to be forced into a lubricant reservoir and to thereby force lubricant from the latter into the part or parts to be lubricated. Such means can comprise an externally threaded member 10 adapted to be screwed into a lubricant reservoir 11. The reservoir or the threaded portion of it is constructed so that it can be rotated. It can be formed as part of a valve stem 11a (Fig. 1) having a wrench-hold portion 12 and extending through valve bonnet 13 to be attached to or form an integral part of valve member seating means 14. The latter can comprise a conventional plug adapted to rotate in valve body 15 in a manner well-known to those skilled in the art. Bonnet 13 can perfect its seal with valve body 15 and with stem 11a by flange ring 16 and packing 17, respectively. Packing nut 17a can be secured in place to maintain packing 17 in sealing relationship with stem 11a. Bonnet 13 can be held in place by studs 18. A stop means 11b and 13a can be arranged to permit seating means 14 to be turned back and forth in body 15 thereby assuring that the valve seating means will be turned to proper position to be in its "off" and "on" position.

Suitable lubricant conducting passageways are provided to connect reservoir 11 with the areas of seating means 14 to be lubricated. Thus, transverse passageway 19 can be provided to receive lubricant from reservoir 11 and to conduct the same to longitudinal passageways 20 from whence it can be spread on the walls of body 15 upon rotation of seating means 14.

Referring now to Figs. 3 to 7, externally threaded member 10 is adapted, as stated, to be forced into reservoir 11 in such a manner as to decrease the volume of the same and force lubricant therefrom. Member 10 has a longitudinal passageway 25 adapted to conduct lubricant into reservoir 11. Passageway 25 has an increased radius portion 26 therein so fashioned to form a shoulder 27 which can act as a valve seat for a seating means such as ball 28. Ball 28 is urged to a seated position by spring 29 which abuts against a retainer ring 30, the latter being held in place by drive pin 30a. Retainer ring 30 likewise has a passageway 31 therethrough for conducting lubricant passing from passageway 25 and around ball 28 into reservoir 11.

Means are provided for introducing a lubricant from an external source, such as a grease gun or other device capable of ejecting lubricant therefrom under pressure, through passageways 25 and 31 into reservoir 11. This means can comprise a cap member 32 adapted to be attached to member 10 by threads 33. Cap member 32 is shaped at its outer end 34 to receive a connecting fitting, such as an Alemite fitting, attached to a grease gun or other source of pressurized lubricant in a fluid tight relationship. In this manner, the external source of lubricant can be readily attached to cap member 32 for forcing lubricant therethrough.

Cap member 32 has a passageway 35 therein which has a reduced diameter portion forming valve seat 36. A seating means such as member 37 is adapted to seat against seat 36 and prevent flow of lubricant from passageway 35 outwardly of cap member 32. Member 37 has a portion 38 for seating in a corresponding portion of cap member 32 and to fit flush with the outer end thereof in order to present a smooth flat face which can be easily wiped free from dirt before the lubricant injecting connection is placed over outer end 34. Although that portion of member 37 which seats against seat 36 is preferably conical in configuration, that portion therebelow is preferably polygonal, e. g. hexagonal, in cross-section as illustrated in Fig. 6 to provide passageways 39 therearound. Thus, when lubricant is forced into the end of cap member 32, it will unseat member 37 from seat 36 to provide a conically shaped passageway leading into passsageways 39 and thence into passageway 35.

Member 37 is urged into its seated position by spring 40 which bears against retainer 41. The latter is seated against shoulder 42 in cap member 32 and has a passageway 43 therethrough.

Cap member 32 is exteriorly shaped to provide a wrench-hold portion adapted to receive therearound a means for permitting member 10 and cap member 32 to turn in one direction, and not in another. In this manner, back and forth rotation of reservoir 11 will cause member 10 to be forced thereinto by the mutually engaging threads. This means can comprise a ratchet means maintained in a non-rotating position with respect to cap member 32 and can have a wrench member 44 adapted to fit over and around the wrench-hold portion of cap member 32 as shown in Figs. 3 and 4. The outer periphery of wrench member 44 can be divided into a plurality of ratchet teeth 45 for co-acting with pawl 46 in the usual ratchet fashion. Wrench member 44 is rotatably received in casing 47 and maintained therein by ring 48 and snap-in retainer 49, the latter being received in an annular groove in the casing. Pawl 46 is received in a handle 50 and biased therefrom by spring 51. The ratchet means can be maintained in proper position around cap member 32 by an annular projecting ring 52 received around member 10 between a shoulder 53 and one end of cap member 32.

A fixed standard is provided to prevent the casing of the ratchet means from rotating. This can comprise a shaft 54 attached in a fixed relation to valve body 15 by a plate 55 received under one of the studs 18. A sleeve 56 having a side-arm 57 for receiving handle 50 therethrough is slidably mounted on shaft 54.

In discussing the operation of the lubricating apparatus, let it be assumed that it is mounted on a valve in the position shown in Fig. 1. A source of grease under pressure is attached to outer end 34 of cap member 32 by, preferably, a snap-on fitting and lubricant under pressure forced into reservoir 11 to fill the same. Such lubricant will unseat member 37 from seat 36 by compressing spring 40 to permit lubricant to flow between member 37 and seat 36 and thence through passageways 39 into passageway 35. The lubricant then passes through passageway 25 to unseat ball 28 before finally emerging into reservoir 11. After the reservoir has been filled, the snap-on fitting can be removed which permits springs 29 and 40 to seat their respective seating elements and prevent escape of lubricant.

Then, upon rotating valve handle 60 to open the valve, pawl 46 will so engage the teeth of wrench member 44 as to prevent member 10 from rotating. The resultant rotation of reservoir 11 (and valve stem 11a) about member 10 will screw the latter into the reservoir forcing lubricant out through passageways 19 and 20 into the valve seat to lubricate the same. Upon rotating valve member 14 to close the valve, pawl 46 will permit wrench member 44 to turn thereby also permitting member 10 to rotate with reservoir 11 (and stem 11a). In this manner, lubricant is forced into the valve seat each time the valve is opened. Of course, if desired, the action of pawl 46 and threaded member 10 can be reversed so that lubricant is forced into the valve seat each time the valve is closed instead of each time it is opened as just described.

When member 10 has been completely forced or screwed into reservoir 11, sleeve 56 and the ratchet means will have followed its downward movement, the latter causing sleeve 56 to slide along shaft 54. To raise member 10 out of reservoir 11 so that the latter can be refilled, the ratchet means can be slipped off the top of cap member 10 by raising it therefrom, and, at the same time, pulling sleeve 56 along shaft 54. Handle 50 can then be disengaged from sidearm 57 and the ratchet means turned over and replaced around cap member 32. Upon manual back and forth rotation of handle 50, member 10 will be screwed out of reservoir 11. Thus, there is provided a means for readily withdrawing member 10 from reservoir 11 when it is necessary to refill the latter.

When member 10 has been forced as far as possible into reservoir 11, valve stem 11a cannot be further rotated to either open or close the valve and thus the operator's attention will be forcibly directed to the fact that the reservoir needs refilling. Of course, should an emergency occur so that it is imperative to close or open the valve, such can be done by raising the ratchet means to disengage it from the cap member as described above.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A lubricating apparatus which comprises, in combination, an externally threaded means adapted to be screwed into a rotatable lubricant reservoir, said threaded means having a longitudinal passageway therethrough, means for preventing flow of lubricant in one direction through said passageway, ratchet means connected to said threaded means for forcing the same into said reservoir upon rotation thereof, and a standard having a sleeve slidably mounted thereon and in sliding engagement with said ratchet means.

2. An apparatus which comprises, in combination, a valve housing having a valve seat, a valve member engaging said seat, an internally threaded valve stem extending from said valve member and constructed to form a lubricant reservoir in communication with said valve seat, an externally threaded member receivable in said reservoir for forcing lubricant from the same, said externally threaded member having a longitudinal passageway therethrough connecting with said reservoir, valve means in said passageway for preventing escape of lubricant therethrough from said reservoir, a cap member carried by the externally threaded member, a ratchet wrench slidably engaging said cap member and including a handle, a standard fixed to the valve body, and means slidably engaging said standard and said handle, said wrench on removal being reversibly engageable with said cap member to provide a means for retracting the externally threaded member.

3. The apparatus of claim 2 in combination with a second valve means adapted to seat into the end of said externally threaded member opposite said valve stem to prevent escape of lubricant externally from the passageway in said externally threaded member and to prevent intrusion of dirt and other non-lubricating material into said passageway.

4. An apparatus which comprises, in combination, a rotatable lubricant reservoir, a threaded member received in said reservoir and having a longitudinal passageway therethrough, a valve seat in an upper portion of said passageway, another valve seat in a lower portion of said passageway at a level normally within the reservoir, seating means in each of said valve seats to permit flow of fluid in only one direction therethrough, and a ratchet means associated with said member for causing movement of said member relative to said reservoir in only one direction along the axis of rotation of said reservoir during rotation thereof.

5. An apparatus which comprises, in combination, an externally threaded member having a longitudinal passageway therethrough, a first valve seat in one end of said passageway, first seating means adapted to seat in said first valve seat, means for biasing said first seating means into said first seat, a cap member on the other end of said member having a longitudinal passageway therethrough, a second valve seat in said last passageway, second seating means adapted to seat therein, biasing means adapted to urge said last seating means into its seat, both of said seating means and said seats being arranged to permit flow in one direction through the passageways in said externally threaded member and said cap member, said cap member having a head thereon adapted to receive a fitting for injecting a material through said valve seats and said passageways, and a ratchet means adapted to slidably fit over said cap member and to prevent rotation thereof in one direction.

6. Lubricating apparatus comprising, in combination, a member adapted to be threadedly received in a rotatable lubricant reservoir, a ratchet wrench operatively engaged with and removably received on a portion of said member, a standard fixedly mounted with respect to said reservoir but held against rotation therewith, and means secured to said ratchet wrench and guidably engaging said standard preventing rotation of said wrench with said reservoir when rotated in one directional sense, said means being disengageable from said standard for facilitating removal of said wrench from operative engagement with said portion of said member.

7. Lubricating apparatus of the character defined in claim 6, in which said wrench and the portion of said member operatively engageable therewith are constructed to permit said wrench to be received on and operatively engaged with said portion in a reversed position, and in which said means secured to the wrench includes a handle for actuation in removing said member from its threaded reception in said lubricant reservoir when said wrench is in said reversed position.

References Cited in the file of this patent

UNITED STATES PATENTS

| Number | Name | Date |
|---|---|---|
| Re. 19,041 | Martin | Jan. 9, 1934 |
| 1,456,326 | Martin | May 22, 1923 |
| 1,547,006 | Smith | July 21, 1925 |
| 1,645,631 | Trinks | Oct. 18, 1927 |
| 2,057,343 | Pierce | Oct. 13, 1936 |
| 2,070,899 | Hamer | Feb. 16, 1937 |
| 2,323,421 | Reed | July 6, 1943 |
| 2,431,299 | Pochek | Nov. 18, 1947 |

FOREIGN PATENTS

| Number | Country | Date |
|---|---|---|
| 429,812 | Great Britain | June 6, 1935 |